United States Patent

[11] 3,556,289

| [72] | Inventor | Wilton R. Erickson |
| | | Kerkhoven, Minn. 56252 |
| [21] | Appl. No. | 761,935 |
| [22] | Filed | Sept. 24, 1968 |
| [45] | Patented | Jan. 19, 1971 |

[54] PIVOTED WHEEL ASSEMBLY FOR ELEVATOR
5 Claims, 3 Drawing Figs.

[52] U.S. Cl. ............................................... 198/233
[51] Int. Cl. .......................................... B65g 41/00
[50] Field of Search .......................................... 198/233,
233(A), 117, 118, 119, 120, 121, 122, 123, 124, 125

[56] References Cited
UNITED STATES PATENTS

| 1,719,919 | 7/1929 | Barber | 198/120 |
| 1,810,119 | 6/1931 | Bebinger | 198/233 |
| 2,657,935 | 11/1953 | Greeley | 198/233X |
| 2,773,586 | 12/1956 | Schmidtke | 198/233 |
| 3,471,001 | 10/1969 | Orloff et al. | 198/122X |

Primary Examiner—Hugo O. Schulz
Attorney—Burd, Braddock & Bartz

ABSTRACT: A material elevator having an elongated conveyor secured to a transverse support. A wheel assembly is pivotally mounted on each end of the support. Upright pivots connect the wheel assemblies to the ends of the support allowing the wheels to be selectively positioned longitudinally and transversely of the elevator. Lock pins hold the wheel assemblies in selected positions. An elongated tow bar connected to one wheel assembly is used to laterally move the entire machine.

PATENTED JAN 19 1971
3,556,289
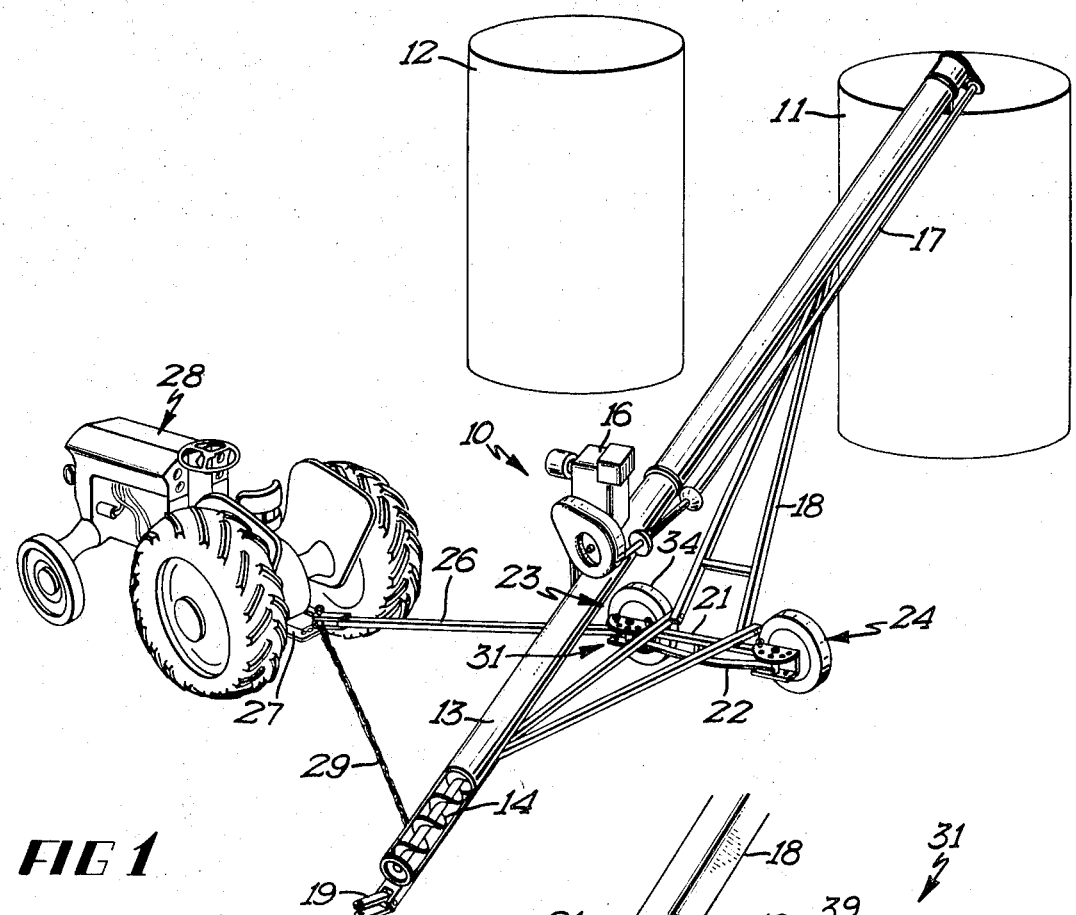
FIG 1
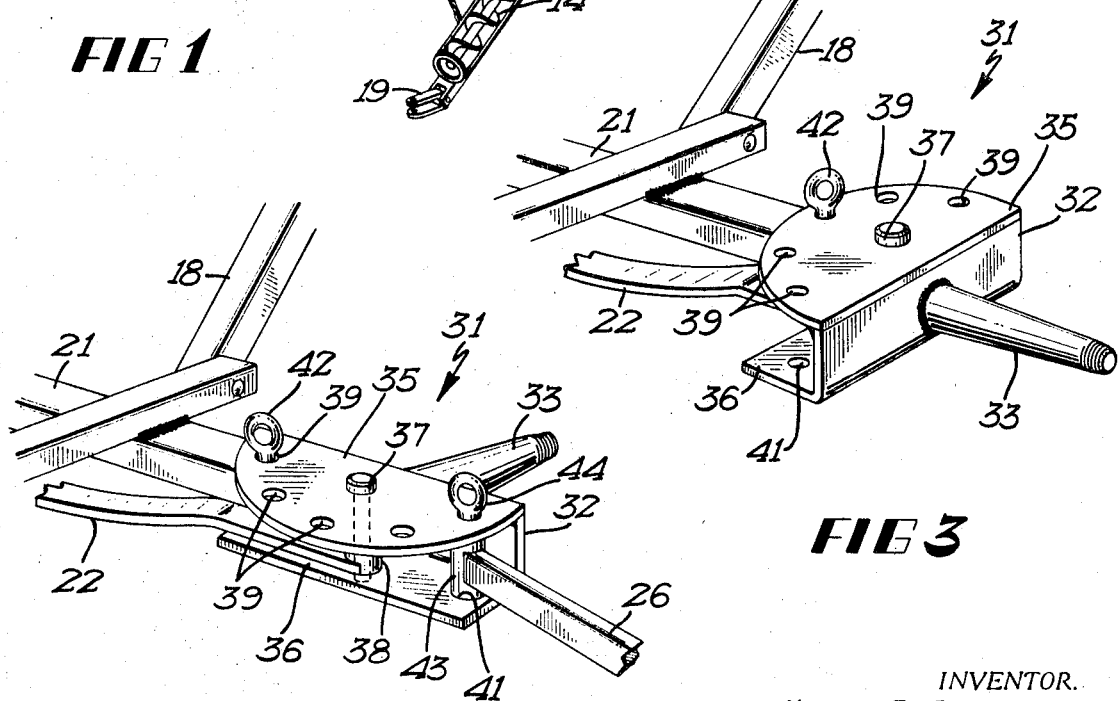
FIG 2
FIG 3
INVENTOR.
WILTON R. ERICKSON
BY
Burd, Braddock & Bartz
ATTORNEYS 3,556,289

PIVOTED WHEEL ASSEMBLY FOR ELEVATOR

BACKGROUND OF INVENTION

Numerous types of wheel assemblies have been used to support material conveyors making the conveyors portable. Commercial conveyors of this type have a pair of transversely spaced wheels rotatably mounted on transverse fixed axles. The fixed axles do not permit the conveyor to be moved laterally without longitudinal movement. Attempts have been made to pivotally mount the conveyor about an upright axis on a wheeled truck to permit swinging movement of the conveyor. An example of this structure is shown in U.S. Pat. No. 2,605,885 issued to Baldwin. The object of the invention is to provide an elevator with stable pivotally mounted wheel assemblies which permit safe lateral movement of the elevator.

SUMMARY OF INVENTION

The invention broadly relates to a material conveying machine having an elongated elevator supported by pivotally mounted wheel assemblies which can be moved to a position so that the elevator can be moved laterally to a new location. The conveying machine has a transverse support with end portions located on opposite sides of the elevator. The wheel assemblies are mounted on the end portions. Each wheel assembly has an upright wheel rotatably mounted on an axle secured to the mount. A pivot pin connects the mount to the end portion of the support for movement about an upright axis. Cooperating with the mount is a lock for securing the mount to the end portion in selected positions whereby the wheel is selectively located longitudinally of the conveyor and transversely of the conveyor. An elongated tow bar connected to the mount is used to move the machine in a lateral direction. The tow bar is connected to the mount in a manner that prevents the conveying machine from tipping or rolling.

IN THE DRAWINGS

FIG. 1 is a perspective view of an elevator equipped with the pivoted wheel assemblies of the invention attached to a tractor used to laterally move the elevator;

FIG. 2 is a perspective view of the wheel mount locked in the transverse wheel position; and FIG. 3 is a view similar to FIG. 2 showing the wheel mount locked in the longitudinal wheel position.

Referring to the drawings there is shown in FIG. 1 an auger conveyor or elevator indicated generally at 10 operable to move bulk material, as grain, corn and the like, into a storage bin 11. When the storage bin 11 is filled the elevator 10 is laterally moved to a new location to fill a second storage bin 12. The elevator has an elongated linear tube 13 enclosing an auger 14. A motor 16 mounted on the tube 13 operates a power transmitting drive 17 to rotate the auger 14. A scissors-type transport frame 18 supports the tube and auger and is operable to change the elevation of the discharge end of the tube. A cable and wench structure or similar structure (not shown) is used to change the angular position of the transport frame to raise and lower the tube. Mounted at the intake end of the tube is a hitch 19 used to tow or longitudinally move the conveyor.

Secured to the midportion of the transport frame 18 is a transverse support 21 having a transverse lower reinforcing member 22. The midsection and opposite ends of the lower member 22 are secured to the support 21 to form a rigid transverse carrying member for the elevator. The elevator may be a bale and corn elevator having endless chains and transverse slats.

Pivoted wheel assemblies indicated generally at 23 and 24 are mounted on opposite end portions of the support 21 for movement about separate upright axes. This enables the wheel assemblies to be positioned longitudinally of the elevator and positioned transversely of the elevator as shown in FIG. 1.

With the wheel assemblies 23 and 24 in the transverse position, the elevator 10 can be moved laterally to position the discharge end of the elevator over the storage bin 12. An elongated tow bar 26 is connected to wheel assembly 23 and the draw bar 27 of the tractor 28. A chain 29 connected to the draw bar 27 and the intake end of the elevator is used to maintain the longitudinal position of the elevator during its lateral movement. The tow bar 26 is connected to the wheel assembly 23 in a manner which prohibits the tipping of the elevator during lateral movement and movement over uneven ground.

Wheel assemblies 23 and 24 are identical in construction and operation. The following description is limited to one wheel assembly. As shown in FIGS. 2 and 3, the wheel assembly has a mount indicated generally at 31 pivotally connected to the end of the support 21 by pin 37. Mount 31 comprises a generally channel-shaped yoke 32 having a base and upper and lower plates 35 and 36. Projected horizontally from the base of the yoke is an axle 33 for rotatably carrying the wheel as shown in FIG. 1. Yoke 32 has an upper horizontal semispherical plate 35 positioned over the top side of the end of support 21. Extended parallel to plate 35 is a lower plate 36 located under the end of the lower support member 22. Upright pin 37 directed through suitable aligned holes in the plates 35 and 36 and the support 21 pivotally couples the mount 31 on the support 21 for movement about a generally upright axis. The end of lower member 22 is secured to an upright sleeve 38 attached by welds or the like to the bottom of the support 21. The sleeve is aligned with the holes for the pin 37 to horizontally stabilize the mount on the support 21.

Spaced around the peripheral portion of plate 35 are a plurality of holes 39. The end holes 39 are aligned with holes 41 in the bottom or lower plate 36. A lock pin 42 selectively inserted through a hole 39 and into a suitable hole in the support 21 locks the mount 31 in a selected angular position. As shown in FIG. 2, the mount 31 is locked in a position locating the axle 33 longitudinally of the elevator and positioning the wheel in the transverse direction. FIG. 3 shows the mount 31 locked in a position whereby the wheel is in a longitudinal position relative to the elevator. The position of the mount 31 relative to the support 21 may be angularly changed as determined by the angular locations of the holes 39.

Returning to FIG. 2, the tow bar 29 has an upright sleeve 43 located between the plate members 35 and 36 in alignment with the holes 39 and 41. A removable pin 44 extends through the holes 39 and 41 and sleeved 43 to to connect the tow bar 26 to the mount. The upright pin 44 prevents independent upright movement of the tow bar 26 relative to the mount 31 so that on lateral movement of the elevator the tow bar 26 being connected to the tractor draw bar will prevent the elevator from tipping. The tow bar 26 acts as a lateral arm used to hold the elevator in its upright position.

In use, lock pin 42 is removed from the mount whereby the mount may be angularly pivoted on the support 21 about the axis of the upright pivot pin 37. To laterally move the elevator, the wheel is placed in a transverse position as shown in FIG. 1 and the lock pin 42 is placed in the mount and aligned hole in the support 21 to hold the wheel in the transverse position. After both wheels have been locked in the transverse position the tow bar 26 is connected to the mount as shown in FIG. 2 with pin 44. In addition to the tow bar 26, the chain 29 is connected to the tractor draw bar. After the discharge end of the elevator is raised from the bin 11 the elevator can be moved laterally without longitudinal movement. The tractor 28 is moved forward until the elevator is aligned with the bin 12.

While there have been shown and described a preferred embodiment of the pivoted wheel support for the elevator, it is to be understood that various changes may be made by those skilled in the art without departing from the spirit of the invention. For example, the auger elevator may be an endless chain bale elevator. The elevator may be operated with a separate motor or through a power takeoff drive. The mount 31 may have differently shaped plate members which are rectangular, semicircular or angularly disposed arms and the wheel am may be supported on bearings carried by the base of the yoke 32. The invention is defined in the following claims.

We claim:

1. A material conveying apparatus comprising: elongated material conveying means, a transverse support having end portions located on opposite sides of the conveying means, means connecting the support with the conveying means, a wheel assembly mounted on each end portion, each wheel assembly having an upright wheel, a mount rotatably supporting the wheel, first generally upright pivot means connecting the mount on the adjacent end portion for movement about an upright axis, lock means for securing the mount to the end portion to selectively hold the wheel in a number of positions relative to the support whereby the material conveying apparatus can be moved in a selected direction, said mount comprising a channellike yoke having a generally upright base and upper and lower generally horizontal members secured to said base, a generally horizontal axle secured to the base and extended in a direction opposite the generally horizontal members, said wheel being rotatably supported on said axle, said horizontal members located and extended adjacent upper and lower sides of an end portion of the support, an elongated rigid tow bar, and upright pivot means connecting one end portion of the tow bar to a horizontal member, whereby the tow bar is an elongated arm to prevent tipping of the material conveying apparatus.

2. The apparatus of claim 1 wherein said first pivot means comprises a first upright pin extended through a horizontal member an and an end portion of the support, said lock means comprises a second upright pin releasably securing a horizontal member to said end portion of the support.

3. The apparatus of claim 2 wherein the horizontal members comprise plate members located adjacent the upper and lower sides of the end portion.

4. The apparatus of claim 1 wherein the upright pivotal connection is an upright pin connecting the tow bar to both horizontal members.

5. The apparatus of claim 2 wherein the horizontal members comprise at least one semicircular plate located adjacent one side of the end portion, said plate having a plurality of spaced holes for accommodating the second upright pin.